United States Patent [19]
Grey

[11] 3,863,192
[45] Jan. 28, 1975

[54] WATERPROOF MECHANICALLY PROTECTED SENSOR PACKAGE AND METHOD OF INSTALLATION

[76] Inventor: Irving R. Grey, 979 Ashbury St., San Francisco, Calif. 94117

[22] Filed: Jan. 24, 1973

[21] Appl. No.: 326,545

[52] U.S. Cl. ................................................ 338/2
[51] Int. Cl. .............................................. G01l 1/22
[58] Field of Search ................................... 338/2–6; 73/88.5 R, 88.5 SD; 156/71, 281

[56]  References Cited
UNITED STATES PATENTS

| | | | |
|---|---|---|---|
| 2,363,181 | 11/1944 | Howland | 338/2 |
| 3,084,300 | 4/1963 | Sanchez | 338/2 |
| 3,315,201 | 4/1967 | Werme | 338/2 |
| 3,475,712 | 10/1969 | Brown | 338/2 |
| 3,599,139 | 8/1971 | Low | 338/2 |
| 3,639,875 | 2/1972 | Brewer | 338/2 |

*Primary Examiner*—C. L. Albritton
*Attorney, Agent, or Firm*—Paul M. Hentzel

[57]  ABSTRACT

A delicate strain gage or sensing device is bonded to a thin support sheet under laboratory conditions to establish a high quality bond with a minimum of bond line thickness. A frame is placed around the sensing device and over the peripheral portions of the support sheet. Chemically impermeable coatings are applied to the sensor, and a potting compound is poured into the frame to cover the sensing device and support sheet for mechanical and environmental protection. The resulting package protects the delicate sensor on all sides - on the top by the potting compound, on the sides by the potting compound and the sidewalls, and on the bottom by the thin support sheet. The package has sufficient bulk for easy handling, but at the same time the sensing device is displaced from the bottom outside surface of the package only by the thickness of the support sheet. When bonded to a specimen to be tested, the sensing device will be a minimum distance away from the surface of the specimen. The sensor package is installed by preparing the specimen surface, applying a bonding adhesive, and clamping the frame to the specimen. A heat source for curing the adhesive is applied to the specimen at points adjacent to or surrounding the sensing device. A heat sensor device is positioned in a geometric location similar to that of the sensing device with another heat source placed in an adjacent or surrounding configuration. Heat is applied about the periphery of both sensors. The heat sensor is connected to a regulator which controls the production of heat at both the sensor locations in order to maintain the curing temperature at the sensor-specimen interface below the permitted peak value.

12 Claims, 10 Drawing Figures

3,863,192

WATERPROOF MECHANICALLY PROTECTED SENSOR PACKAGE AND METHOD OF INSTALLATION

FIELD OF INVENTION

This invention relates to installing sensors for detecting physical parameters, more particularly to packaging the sensors under laboratory conditions and to installing the packages on specimens in the field.

DESCRIPTION OF THE PRIOR ART

Heretofore, strain gages have been epoxy bonded directly on at the construction site as shown in U.S. Pat. No. 2,963,773 to Starr. Bonding with an epoxy or polymide adhesive is the preferred mounting technique. However, the specimen to be tested is frequently located in a shipyard, factory, or construction site. Contaminants inherently in the air in such places, ie. dust, oil, smoke, snow, and salt spray, result in contamination of the epoxy bonding substances and the surfaces to be bonded giving a poor bond between the specimen and the sensor. This contamination effect is especially noticeable when employing the preferred solvent release or solvent thinned adhesives to form the bond. This type of adhesive requires a precontact drying time for the solvent to evaporate. During this drying time the adhesive surface is exposed to the contaminants in the air. As a result, strain gages mounted by these techniques under contaminated conditions are frequently inadequately bonded and do not provide accurate readings or even break loose from the specimen when stressed.

An additional handicap to mounting sensors at the specimen location is the difficult and inaccessable positions that the technicians frequently encounter while mounting the sensors. Technicians are regularly required to work on scaffolding exposed to the elements, on top of ladders, or even under such frustrating circumstances as hanging upside down inside a pit with a flashlight. Due to these clumsy positions, delicate strain gages are frequently damaged and poorly bonded to the specimen.

Connecting the electrical leads to the soldering tabs on the sensor presents another problem. The sensors are typically extremely small requiring a 40 watt soldering iron or less with a 30 mil tip or smaller. The effects of the wind and elements easily cool the small tips of these low-powered irons to below the critical soldering temperature, resulting in cold solder joints.

The prior heat curing technique shown in U.S. Pat. No. 3,082,139 to Clark could contribute to sensor failure. The curing heat was applied directly through the strain gage into the specimen without regulation. The sensors were frequently burned out by excessive curing heat, or the bonding was badly cured leading to a poor engagement. Due to the small area of most modern sensor devices, a good bond is required over the entire area. A small void area may cause the sensor to lose engagement when handled or give an erroneous reading when subjected to the specimen strain.

U.S. Pat. No. 3,222,627 to Tolotta shows a small pan-like container spot-welded to the specimen at the site. The sensor is then bonded in the container which is then filled with potting compound to encapsulate the sensor. This strain gage package is formed at location under unfavorable site conditions. The resulting bonding is subjected to the above problems and disadvantages.

Another on-site assembly technique is taught in U.S Pat. No. 3,105,139 to Russell. A strain gage filament is mounted in a small tube spot-welded to a base member. This assembly is taken to the site and edge-welded to the specimen. This peripheral welding forms an adequate bonding for tension tests. However, under compression these peripheral type bondings tend to buckle. A further drawback of the Russell structure is the displacement between the strain gage filament and the specimen. For accurate measurement, it is desireable to minimize the distance between the filament and specimen. Russell notes the buckling problem and proposes a sonic spot weld across the testing device. This type bonding is not along 100 percent of the surface area and hence is less favorable than the epoxy bonding. Further the sonic welding must be done under the unfavorable construction site conditions.

SUMMARY OF THE INVENTION

It is therefore an object of this invention to provide: a sensor package which is assembled under laboratory conditions having a controlled environment with a minimum of contaminants; a sensor package with a bond line of minimum thickness between the sensor and the support sheet forming the bottom of the package; a sensor package which is waterproof and mechanically viable; a sensor package having sufficient bulk to be easily handled; a sensor package with a minimum of prestrain caused during packaging; a sensor package which may be calibrated for prestrain caused by packaging; a sensor package which can be easily mounted to the specimen and connected in the field; a sensor package which has a large area for bonding to the specimen relative to the area of bonding between the sensor and the support sheet; and a sensor package which is bonded to the specimen by a thermosetting adhesive wherein the heat is regulated and applied to the package through the specimen.

BRIEF DESCRIPTION OF THE DRAWINGS

Further objects and advantages of the packaged sensor and the method of installation thereof will be apparent from the following detailed description taken in conjunction with the drawings in which:

FIG. 1 shows a sensor device 10 being mounted on a support sheet or plate 12 and bonded thereto by an adhesive 14 which is applied to the under surface of sensor device 10 or to the upper surface of sheet 12. Sensor device 10 may be one of any number of types designed to detect and measure physical parameters of a specimen – ie. foil or wire or semiconductor material for sensing strain or heat. Sensor device 10 of FIG. 1 is shown as a strain gage comprised of foil grid 16 mounted on a backing 18. Backing 18 is provided to support the delicate sensor and may be an insulative material bonded to foil 16, or may be a thin epoxy layer formed along the bottom of foil 16. Backing 18 is preferrably 1 to 2 mils in thickness or thinner, to minimize the sensor displacement from the specimen.

Figure 1:
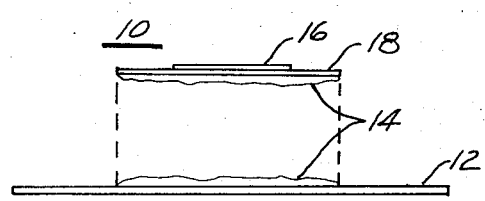
FIG. 1 is a side view of a sensor and support sheet about to be bonded.
Figure 2:
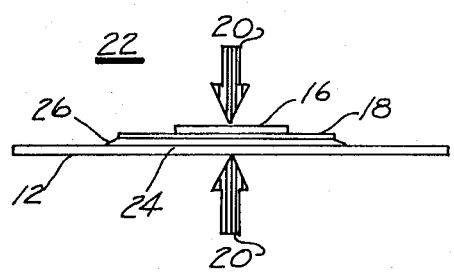
FIG. 2 is a side view of a sensor sheet assembly clamped and ready for heat curing showing the adhesive bond line and edge fillet.

Sensor 10 is pressed against sheet 12 and clamped into position by clamp means 20 to form assembly 22 shown in FIG. 2. Bonding adhesive 14 oozes out from between sensor 10 and sheet 12 under the pressure of clamp 20 to form a fillet 26 completely about the periphery of backing 18. Fillet 26 aids in sealing bond line 24 between backing 18 and sheet 12. In addition, fillet 26 minimizes the possibility of backing 18 peeling away from plate 12 and eliminates the step change in height across assembly 22 caused by the thickness sensor 10.

The adhesive 14 is preferably a thermosetting solvent release or solvent thinned type epoxy or polymide which spreads easily producing a thin bond line 24 for minimizing creep within the bond and displacement between foil 16 and the specimen to be tested. A thinner bond line is obtained because of the low viscosity of the adhesive employed, accurate control over the clamping pressure and position, and precise knowledge of the contours of sheet 12 which is normally flat. Sheet 12 may be precurved to fit curved specimens. Solvent thinned adhesives require an air drying period prior to engagement to evaporate the solvent or thinner. During this air drying, adhesive 14 on sensor 10 and/or sheet 12 is exposed to the environment and is subject to degradation by airborn contaminants. Preferably, the contaminants in the clean room are minimized and the drying or exposure time is kept as short as possible. If too short a drying time is provided, the solvent does not adequately evaporate and bubbles of solvent form along the upper surface of bond line 24 during heat curing resulting in voids in the bond line 24. Too long a drying time precludes proper curing of the adhesive and results in a bond of inadequate strength.

A specialist working under laboratory conditions can fabricate assembly 22 with a minimum bond line 24. The controlled conditions and clamping and minimum contamination permit the most suitable adhesive to be employed. In the clean room there is no oil, dust, smoke, salt, or chemically active exhaust fumes. Further, the laboratory conditions provide good lighting and the most convenient position for clamping or mounting the sensor 10. This is in contrast to the miserable conditions prevailing at most installation sites.

Figure 3:
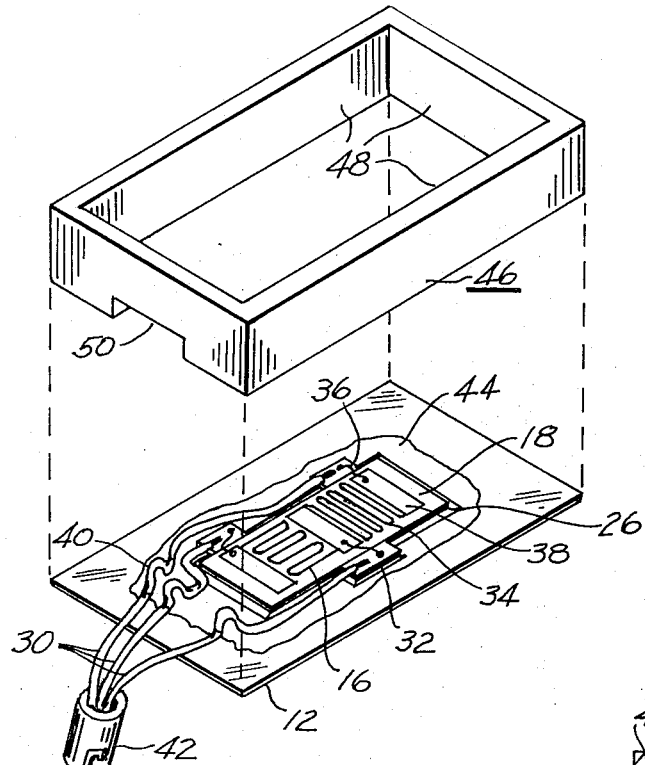
FIG. 3 is an isometric view of the sensor-sheet assembly of FIG. 2 with the leads attached and the clamping frame being positioned.

FIG. 3 shows assembly 22 with lead wires 30 soldered to lead solder tabs 32 on backing 18. Tabs 32 are connected to strain grids 34 of sensor 16 by short conductors 36 extending from lead tab 32 to grid solder tabs 38 formed at the ends of grid 34. The soldering of short conductors 36 from lead solder tab 32 to grid solder tab 38 and of leads 30 to the small lead soldering tabs 32 is a very delicate procedure which is best performed under laboratory conditions with good lighting and mechanical positioning. This soldering is at best a poorly accomplished in the field where the soldering temperature varys as a function of the wind and outside temperature. Further, the technician must frequently work from an unbalanced position. Leads 30 are provided with strain relief crimps 40 and may terminate in cable connector 42 for easy connection to the electrical test apparatus used in field testing and monitoring. An environmental coating 44 more clearly shown in FIG. 4 may then be provided over sensor 10 to further protect the delicate foil 16 and the sensor bond line 24 from deterioration by establishing an air tight hermetical seal. Xylene thinned polyurethane is a suitable environmental coating. At room temperature it is tack free in 20 minutes, dry in 2 hours, and fully cured in 24 hours. Thereafter, it's chemical resistance and coating hardness increases for six days.

A clamping frame 46 having sidewalls 48 with a lead cutout 50 is positioned over assembly 22 with the sidewalls 48 contacting the periphery of support sheet 12. Leads 30 extend through lead cutout 50. Other provisions for leads 30 may be provided, such as a notch similar to cutout 50 along the top edge of clamping frame 46 or holes drilled through sidewall 48.

Figure 4:
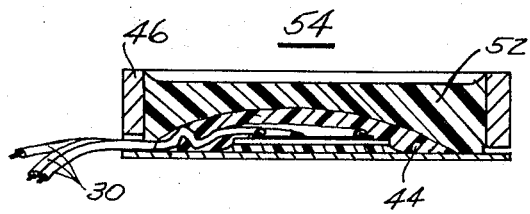
FIG. 4 is a sectional view of the completed package of FIG. 3.

The cavity formed by assembly 22 and clamping frame 46 is filled with a protective fill such as a silicone potting compound 52 forming sensor package 54 shown in FIG. 4. Sensor device 10 is now completely encapsulated and protected on all sides. Sensor 10 is protected on the bottom by plate 12, on the top by potting compound 52, and on the sides by clamping frame 46. Package 54 is a waterproof, mechanically protected package which can withstand rough handling and the elements and contamination at the installation site. Package 54 has sufficient bulk to be easily handled, but at the same time sensor device 10 is mounted a minimal distance away from the outside surface of plate 12 which ultimately will engage the specimen to be tested. The function of stress relief crimps 40 is enhanced by potting compound 52 which grips crimped leads 30. It is preferred that frame 46 is not bonded directly to support sheet 12, but that frame 46 is adhered thereto by the adhesive quality of potting compound 52. In this manner, frame 46 is only resiliently bonded to sheet 12 minimizing mechanical reinforcement of sheet 12 and possible erroneous strain readings.

It is desirable to minimize prestrain of foil 16 during packaging. However, the amount of prestrain present after packaging, if any, may be determined by temporarily mounting package 54 on a laboratory test specimen and comparing the results to standard strain gages of known accuracy. This determined prestrain is accounted for during the subsequent field use by calibrating the equipment or merely subtracting the prestrain from the field strain. The temporary bonding is accomplished by employing a dissolvable adhesive such as a soluble cyanoacrylate. Alternatively, permanent adhesive may be employed to bond the sensor package by means of removable tabs 55 shown in FIG. 7. The prestrain may be determined without using any bond merely by applying a known tensile force across the sensor package at tabs 55.

Figure 5:
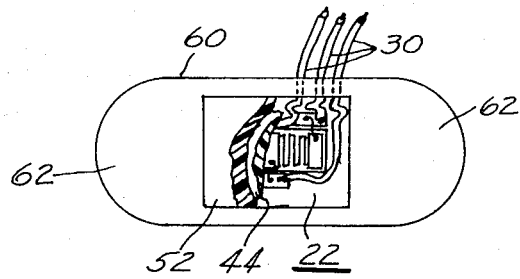
FIG. 5 is a top view of a sensor package with a modified support sheet and frame.
Figure 6:
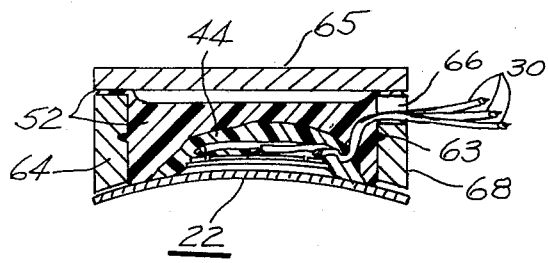
FIG. 6 is a sectional view of a closed top frame contoured along the bottom to accommodate a curved specimen.

Clamping frame 46 may vary in shape to accommodate package 54 and the specimen to be tested. As shown in FIG. 5 and 6, broader surface areas of modified clamping frames may be utilized to permit more of the correspondingly shaped support plate thereunder to be pressed against the specimen to be tested during the installation of package 54. In the FIG. 5 embodiment, modified frame 60 has enlarged clamping surfaces 62 at each end thereof.

In FIG. 6 a round frame 64 with a top cover 65 is provided with a lead cutout 66 in the upper portion of sidewall 68. Sidewalls 68 are provided with gripping cavities 63 to assist in securing frame 64 to protective fill 52. The bottom of frame 64 is curved to accomodate a cylindrical specimen such as a pipe or rod. By packaging sensor 10 in the curved position shown, prestrain in minimized and the available strain is conserved for testing the specimen. In these convex specimen applications it is preferred that the curvature of the support plate be slightly greater than the curvature of the cylindrical specimen to insure that the thinnest bond lines occur under the sensor. The opposite curvature conditions are preferred for concave specimen situations. The top cover 65 may be held in place with adhesive or preferrably with excess potting compound utilized in the protective potting procedure.

Figure 7:
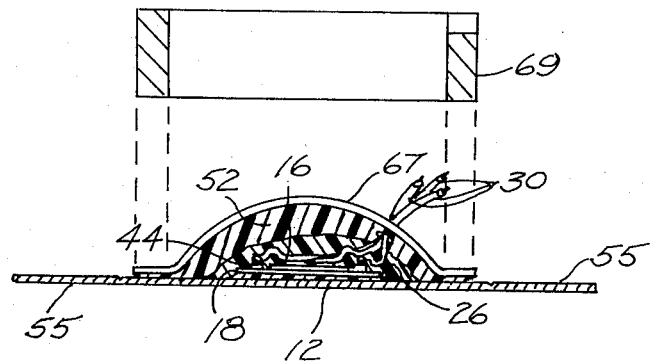
FIg. 7 is a sectional view of a blister packaged sensor.

FIG. 7 shows a blister packaged strain gage similar to package 46 except that frame 46 has been replaced by a blister shield 67. Shield 67 offers less reinforcement to sheet 12 than does the sturdier frame 46; and may be peripheraly bonded directly to sheet 12 or adhered thereto by adhesive potting compound 52 as shown in FIG. 7. A removable clamping ring 69 is provided to facilitate clamping the blister package to the specimen during bonding at the installation site.

Figure 8:
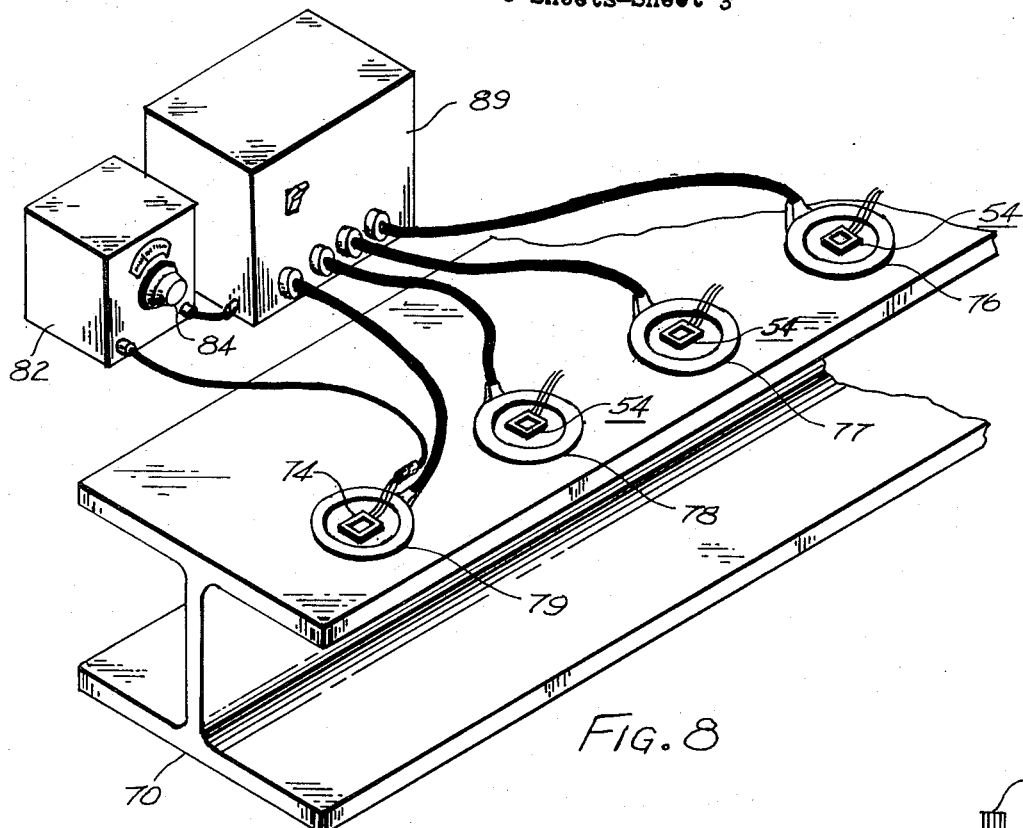
FIg. 8 is an isometric view showing several sensor packages being simultaneously mounted on a specimen.
Figure 9:
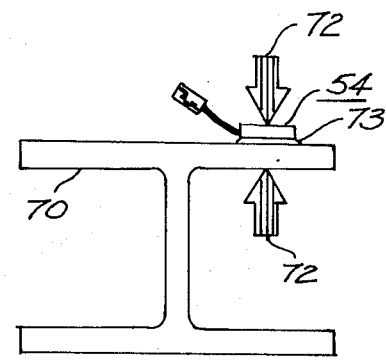
FIG. 9 is a side view of a sensor package clamped to the specimen of FIG. 8.

FIG. 8 shows several sensor packages 52 being mounted on a specimen 70. The selected area on specimen 70 is first ground to a relatively smooth finish, treated with 400 grit paper and etching acid, and then washed in a manner similar to the prebonding treatment of support plate 12. Next a 100 percent solids, heat cured adhesive is applied to the treated portion of the specimen or to the bottom of package 54, or both. The 100 percent solids adhesive is preferred because, inn contrast to the solvent thinned liquid adhesive, 100 percent solids adhesives do not require a preclamping, air drying period. Bonds which are exposed to the environment at the construction site for drying are subject to contamination. Further, 100 percent solids adhesives do not require liberation of a volatile solvent for setting. The solvent in thinned type epoxys produce bubbles in the bond line if insufficient drying time is provided. Package 54 is then clamped to specimen 70 by clamping means 72 shown schematically in FIG. 9 forming specimen bond line 73. A variety of conventional clamping techniques may be employed.

A heat sensor 74 is mounted in a thermally similar place as packages 54. Electrical heaters 76, 77, 78, and 79 are placed about clamped packages 54 and temperature sensor 74. These heaters are preferably shaped to provide a symetrical heat distribution. Other shapes may be employed. Heating current is supplied to the heaters by the power supply 80 which causes the heat to be applied to specimen 70 around the periphery of packages 54, and not directly to the packages and then to specimen 70. Controller 82 which is responsive to the temperature of heat sensor 74 regulates the heating current supplied to all the ring heaters as determined by the temperature at heat sensor 74. Control 84 may be adjusted to set the regulation temperature of heat sensor 74. In some instances, regulator adjustment 84 will be set to the peak curing temperature of the 100 percent solids adhesives. In other instances where specimen 70 has a high thermal inertia, adjustment 84 is preferably set to a temperature slightly below the peak curing temperature. Heat stored in specimen 70 immediately under the heating rings will cause a slight rise in temperature of the clamped packages 52 after the heating current has been cut off by controller 82.

Alternatively, other sources of heat such as white gas, natural gas, or other controllable sources of heat may be employed with suitable ring burners and regulating apparatus.

Preferably, support sheet 12 which forms the bottom of package 54 is selected from a material similar to the specimen material. It is desireable that the coefficient of thermal expansion and the modules of elasticity of the two materials match. This matching minimizes thermal strain introduced by the heat curing step and distortion as a result of uneven creep between the materials.

The heater establishes an maximum temperature at the surface of specimen 70 immediately thereunder. The temperature of specimen 70 decreases radially out from the ring and decreases toward the center of the heating ring resulting in a minimum temperature at the center of the ring. It is preferable to mount the packages 54 proximate this center temperature minimum. The package 54 is not exposed directly to the applied heat, and heat damage is minimized.

Due to the large area of specimen bond 73, the bonding quality need not be as high as sensor bond 24 and still maintain a viable bond producing accurate strain readings. Specimen bond 73 is not as critical as sensor bond 24 which has a much smaller area, and some environmental deterioration may be permitted. In the prior art technique all the bonding was done at the construction site, and frequently resulted in physical damage to the sensor, bad bonding between the sensor and the specimen and cold solder joints on the leads. Sometimes as high as 50 percent loss rate was encountered; that is, for one reason or another up to 50 percent of the installed sensor devices failed to function adequately. Not only was the price of the sensor device lost, but also the cost of installation. In the present technique, the more critical bond 24 is accomplished under laboratory conditions, and the less critical larger bond 73 is performed under the less desireable site conditions. Physical damage to the sensor is prevented by the package protection, and all soldering is performed under laboratory clean room controlled conditions.

Figure 10:
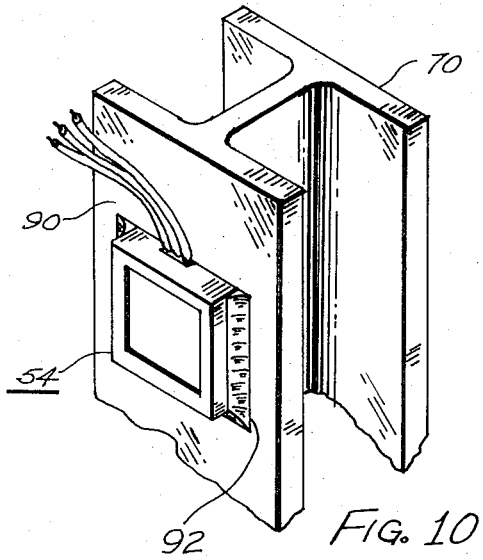
FIG. 10 is an isometric view of a sensor package being mounted on a nonhorizontal surface showing a resilient fillet-dam therearound for retaining the bonding adhesive during curing.

FIG. 10 shows package 54 being mounted on a nonhorizontal surface 90. First the package is clamped in position on specimen 70 and a fillet 92 of a resilient room temperature vulcanizing silicone is provided around three edges of the package 52 leaving the top edge without a fillet. After the silicone compund has dried, package 54 may be pried a 16th of an inch or so away from specimen 70 along the top unfilleted edge and the adhesive forced into the cavity under package 54 from a syringe or applicator. After the adhesive distributes in the space between package 54 and specimen 70, package 54 is forced once again against specimen 70 and clamped for heat curing. The fillet or dam formed by the silicone compound prevents the specimen bonding adhesive from running out the bottom or sides and being lost. This fillet technique may be employed on any nonvertical or contoured surface to prevent the adhesive from running out of the bond.

I claim as my invention:

1. A sensor package adapted to be mounted on a specimen to determine physical parameters thereof, comprising the combination:
   a protective mounting sheet one side of which is adapted to be adhered to the surface specimen;
   at least one sensor device firmly adhered to the other side of the mounting sheet by a suitable adhesive material;
   rigid enclosure means positioned around the at least one sensor device and proximate the periphery of the mounting sheet forming a cavity in which the at least one sensor is positioned;
   protective fill positioned within the cavity for covering the at least one sensor device; and
   the mounting sheet and enclosure means and the protective fill forming a package around all sides of the sensor device for protecting the sensor device from mechanical and environmental damage prior to and subsequent from mounting the sensor on the specimen.

2. The sensor package of claim 1, wherein an environmental protection coating is provided over the at least one sensor device adhered to the mounting sheet prior to applying the protective fill.

3. The sensor package of claim 1, wherein an insulative backing is provided between the sensor device and the mounting sheet.

4. The sensor package of claim 1, wherein the material of the mounting sheet is selected to minimized thermal expansion mismatch between the mounting sheet and the specimen.

5. The package of claim 1, wherein the material of the mounting sheet is selected to have a modulas of elasticity comparable to the modulas of elasticity of the specimen to promote undistorted strain transmission from the specimen to the at least one sensor device.

6. The sensor package of claim 1, wherein the suitable adhesive material is a suitable epoxy and bonds the at least one sensor to the mounting sheet.

7. The sensor package of claim 1, wherein the suitable adhesive material is the solvent release type for minimizing the bond line between the sensor device and the mounting sheet.

8. The sensor package of claim 1, wherein the rigid enclosure member is not secured directly to the mounting sheet, and the protective fill is an adhesive substance for retaining the enclosure member around the at least one sensor device.

9. The sensor package of claim 1, wherein the protective fill is an elastic material incapable of transmitting substantial stress.

10. The sensor package of claim 8, wherein the rigid enclosusre means is an opened top frame member.

11. The sensor package of claim 8, wherein the rigid enclosure means extends away from the mounting sheet to a height above the at least one sensor device.

12. The sensor package of claim 8 wherein the protective fill is an elastic material incapable of transmitting substantial stress.

* * * * *